(12) United States Patent
Gupta

(10) Patent No.: US 7,782,752 B2
(45) Date of Patent: Aug. 24, 2010

(54) PILOT BASED SAMPLING FREQUENCY OFFSET ESTIMATION AND CORRECTION FOR AN OFDM SYSTEM

(75) Inventor: Parul Gupta, Karnataka (IN)

(73) Assignee: Ittiam Systems (P) Ltd., Bangalore, Karnataka (IN)

( * ) Notice: Subject to any disclaimer, the term of this patent is extended or adjusted under 35 U.S.C. 154(b) by 1083 days.

(21) Appl. No.: 11/422,604

(22) Filed: Jun. 7, 2006

(65) Prior Publication Data

US 2007/0286062 A1 Dec. 13, 2007

(51) Int. Cl.
*H04J 11/00* (2006.01)
(52) U.S. Cl. .................. 370/208; 370/210; 375/260
(58) Field of Classification Search ......... 370/203–210; 375/260, 344
See application file for complete search history.

(56) References Cited

U.S. PATENT DOCUMENTS

2008/0089458 A1* 4/2008 Wallace et al. .............. 375/371

2009/0073869 A1* 3/2009 Chadha et al. .............. 370/208

* cited by examiner

*Primary Examiner*—Ian N Moore
(74) *Attorney, Agent, or Firm*—Prakash Nama; Global IP Services, PLLC

(57) ABSTRACT

A technique for improving the performance of OFDM (Orthogonal Frequency Division Multiplexing) systems addresses the Sampling Frequency Offset (SFO) estimation and correction problems of conventional techniques and provides improved performance in a wide range of operating conditions. The technique teaches a correction scheme that uses known pilots in each OFDM symbol to estimate slope of phase error and subsequently calculate the correction factor for each of the sub-carriers in the associated OFDM symbol. The present subject matter further teaches an averaging slope estimates over a window of predetermined number of OFDM symbols to average out noise and get a refined correction factor. In addition, the present technique teaches tracking rate of growth of slope across OFDM symbols to estimate SFO, which can be used for the timing error correction in the time domain.

6 Claims, 3 Drawing Sheets

PILOT BASED SAMPLING FREQUENCY OFFSET ESTIMATION AND CORRECTION FOR AN OFDM SYSTEM

TECHNICAL FIELD OF THE INVENTION

The present invention relates generally to communications systems such as OFDM (Orthogonal Frequency division multiplexing) systems and particularly for improving the performance of such systems by using improved sampling frequency offset estimation and correction techniques.

BACKGROUND OF THE INVENTION

Frequency Division Multiplexing is used in a number of commercial wired and wireless applications, such as local-area network (LAN) products. It is a communications technique that divides a communications channel into a number of frequency bands. A sub-carrier carrying a portion of the user information is transmitted in each band. In OFDM (Orthogonal Frequency Division Multiplexing) systems, each sub-carrier is orthogonal with every other sub-carrier.

Typical commercial wireless applications include a transmitter with an antenna which transmits a signal through a channel where it undergoes reflection, absorption, attenuation, and takes multiple paths, as a result of which, the signal gets distorted when it reaches a receiver that is situated at a distance. OFDM systems are chosen for such applications because of their capability to operate in multi-path channels.

In an OFDM system, a transmitter typically codes, interleaves, and modulates a stream of information bits to obtain a stream of modulation symbols. The transmitter may transmit the OFDM symbols in frames, with each frame containing multiple OFDM symbols. The frames are further processed and transmitted to a receiver. The receiver then performs complementary processing and obtains the samples for each received OFDM symbols. The receiver typically performs frequency error estimation to determine the frequency error at the receiver. The frequency error may be due to a difference in the frequencies of the oscillators at the transmitter and receiver, Doppler shift and so on.

The performance of OFDM systems is generally very sensitive to the presence of frequency offsets. Typically, the transmitter and receiver clocks have to be synchronized and any resulting offsets can severely degrade the OFDM system performance. Generally, these offsets have to be estimated and compensated for reliable data recovery. The carrier frequency offset (CFO) can usually be estimated simply by calculating the correlation during known repeated preamble sequences or during the guard interval with a corresponding data portion. Further, in systems where the carrier and sampling clocks are derived from the same oscillator (i.e., locked clocks), for example IEEE 802.11a systems, sampling frequency offset (SFO) can be derived directly by scaling the CFO by a ratio of the clocks. However in some OFDM systems, the carrier and sampling clocks need not be derived from the same oscillator. In such instances, the carrier and sampling offsets will be independent and may need separate estimation algorithms and can be difficult and cumbersome to implement, estimate and compensate for reliable data recovery to improve OFDM system performance.

SUMMARY OF THE INVENTION

The present invention aims to provide a method for estimation of SFO by using frequency-domain pilot symbols for OFDM systems that use different oscillators to derive carrier and sampling clocks at the receiver and transmitter and subsequent correction of the error due to that offset. According to an aspect of the invention, there is provided a method for estimating and correcting the SFO, comprising the steps of receiving a sequence of OFDM symbols by a receiver, wherein each OFDM symbol includes multiple pilot symbols, performing an FFT on a current OFDM symbol to obtain data sub-carriers and associated multiple pilot sub-carriers, computing a slope of phase error associated with the multiple pilot sub-carriers, computing a correction factor using the slope of phase error, and applying the correction factor to the data sub-carriers associated with one or more OFDM symbols starting from the current OFDM symbol.

BRIEF DESCRIPTION OF THE DRAWINGS

A more detailed understanding of the invention may be had from the following description of preferred embodiments, given by way of example only, and to be understood in conjunction with the accompanying drawings in which.

DETAILED DESCRIPTION

In the following detailed description of the various embodiments of the invention, reference is made to the accompanying drawings that form a part hereof, and in which are shown by way of illustration specific embodiments in which the invention may be practiced. These embodiments are described in sufficient detail to enable those skilled in the art to practice the invention, and it is to be understood that other embodiments may be utilized and that changes may be made without departing from the scope of the present invention. The following detailed description is, therefore, not to be taken in a limiting sense, and the scope of the present invention is defined only by the appended claims and their equivalents.

The term "FFT" refers to Fast Fourier Transform, which is an efficient algorithm to compute the Discrete Fourier Transform (DFT) and its inverse. The FFT operation takes a discrete signal in the time domain and transforms that signal into its discrete frequency domain representation.

Figure 1:
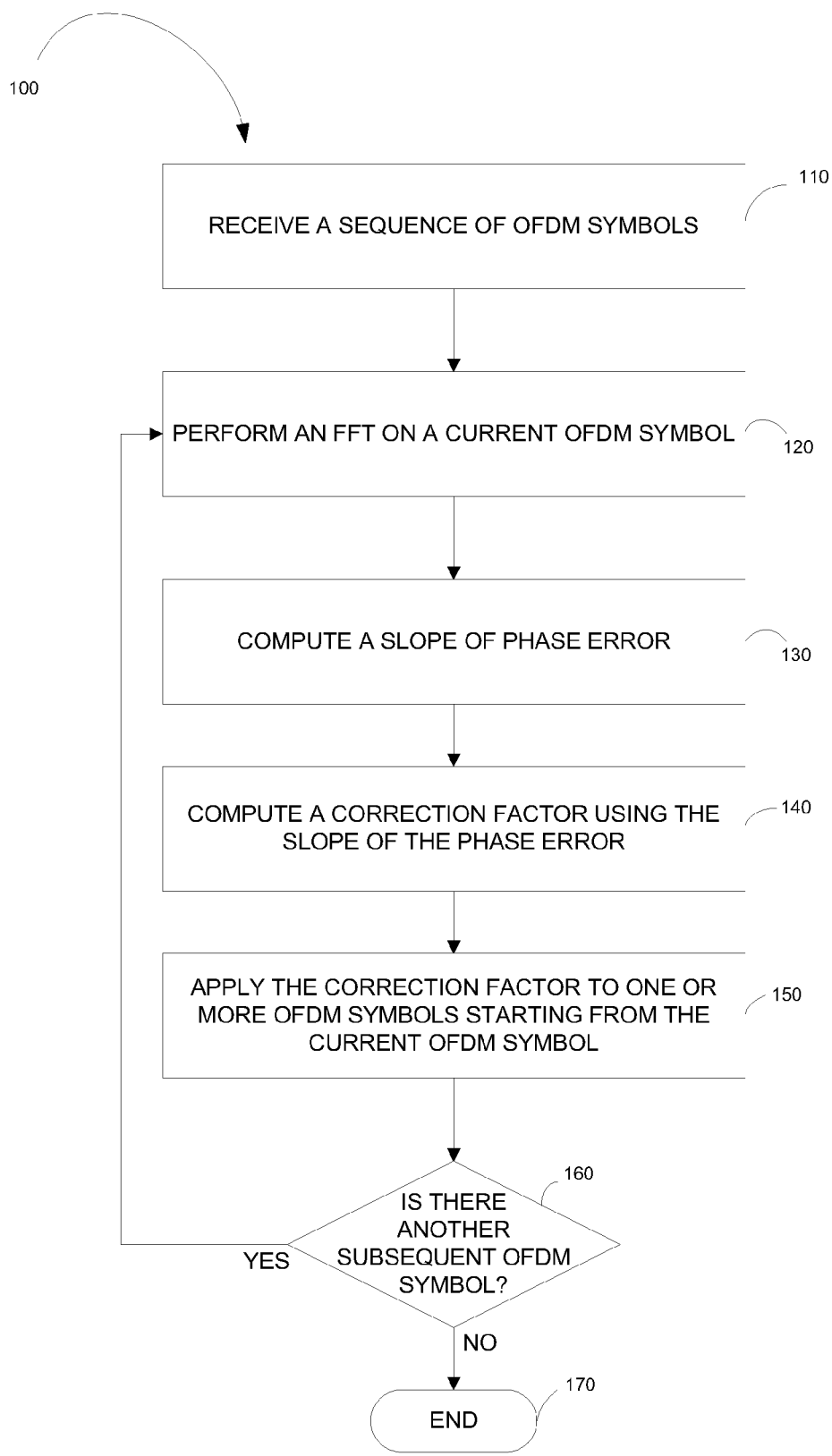
FIG. 1 is a flowchart illustrating an SFO estimation and correction technique according to an embodiment of the present subject matter.

Referring to FIG. 1, at step 110, the method 100 in this example embodiment receives a sequence of OFDM symbols. In these embodiments, the sequence of OFDM symbols is received by a receiver. Also in these embodiments, the each received OFDM symbol includes multiple pilot symbols.

At step 120, an FFT operation is performed on a current OFDM symbol received by the receiver to obtain data sub-carriers and associated multiple pilot sub-carriers. Typically, after performing FFT on the OFDM symbols, the effect of sampling offset can be seen as outlined below:

Wherein l is an OFDM symbol index, k is a sub-carrier index, $X_{l,k}$ is a transmitted symbol, $R_{l,k}$ is a received symbol, $H_{l,k}$ is a channel distortion, $W_{l,k}$ is a additive white noise, N(l,k) is an additional noise generated due to Inter Carrier Interference(ICI) on the kth sub-carrier during the lth OFDM symbol, $T_u$ is the useful symbol period (for example, 3.2 µs for an IEEE 802.11a OFDM symbol), $T_s$ is a total symbol period, i.e. useful plus the guard duration (for example, 4 μs for an IEEE 802.11a OFDM symbol) and $t_A$ is a normalized sampling error which is defined as Wherein T and T' are the transmitter and receiver sampling periods, respectively.

At step 130, a slope of phase error associated with the multiple pilot sub-carriers is computed. In one embodiment, the slope s on the lth OFDM symbol is estimated using the equation:

Wherein i is the pilot index and $p_{l,i}$ is the $i^{th}$ transmitted pilot during the lth OFDM symbol. For example, for an IEEE 802.11a symbol, i belongs to {−21, −7, 7, 21}.

At step 140, a correction factor is computed using the slope of phase error. In these embodiments, the correction factor to be applied to the k th sub-carrier is $\exp(-ks_l)$.

The above example discussed approach corrects the constant time shift accumulated till the lth OFDM symbol, which is seen as a linearly growing phase in the frequency domain.

At step 150, the computed corrector factor is applied to the data sub-carriers associated with one or more OFDM symbols starting from the current OFDM symbol.

As shown in FIG. 1, the above steps 110-150 are repeated for each substantially subsequent OFDM symbol.

In some embodiments, an average slope is computed using computed slopes of phase errors associated with a predetermined number of OFDM symbols. The correction factor is then computed using the computed average slope and then applied to the data sub-carriers of the received sequence of OFDM symbols.

The above averaging scheme reduces noise on the slope estimates. The averaging of the computed slopes can be obtained using the slopes associated with substantially adjacent OFDM symbols. Typically, the slope grows linearly across symbols and therefore averaging can be performed over a same number of past and future OFDM symbols around a desired OFDM symbol. Alternatively, the averaging of the slope can be performed over a finite number of past OFDM symbols to reduce the requirement of buffering of future samples in hardware. The refined estimate ($s_l'$) thus formed can be used for per-symbol correction of $\exp(-jks_l')$ and for forming the SFO estimate for feedback to the interpolator as described below.

The slope of phase error for the lth OFDM symbol is related to the sampling error $t_A$ and the system parameters by the equation:

In some embodiments, a rate of growth of the computed slopes of phase errors associated with the predetermined number of OFDM symbols is estimated. An estimate of the SFO is then obtained from the estimated rate of growth of the computed slopes of phase errors. The rate of growth of the slope across OFDM symbols, r, is related to the sampling error as follows:

For very long packets, the phase on the pilots can accumulate to become big enough to wrap around −π/π, thereby affecting the linearity of the phase. When phase linearity is affected, the pilot sub-carriers can no longer be used to estimate the slope.

For such longer packets, to prevent buildup of a large slope and consequently phase which can wrap, time-domain timing correction can be applied to the samples before performing FFT on them. For example, interpolation can be used for time-domain timing correction. The rate of the grown of the slope r can be used to form an estimate of the SFO and feed it back to the interpolator. This is done after sufficient symbols are obtained to make a good estimate.

In some embodiments, an average slope using each one of multiple computed slopes of phase errors associated with each one of multiple predetermined number of OFDM symbols is computed. A rate of growth of the computed average slopes is then estimated from the computed slopes of phase errors. An estimate of the SFO from the estimated rate of growth of the computed average slopes is then obtained.

Wherein $N_s$ is the number of symbols after which an SFO estimate is formed, $S'_{N_s}$ is the computed average slope for the OFDM symbol $N_s$ and Na are predetermined number of OFDM symbols used for computing the average slope.

In the above embodiment, instead of dividing the averaged slope on the symbol $N_s$, $s'_{N_s}$ by $N_s$, the slope can be divided by $(N_s - N_a/2)$ to remove a bias introduced by averaging only past symbols. In some embodiments, $N_s$ can be chosen to be about 100 and $N_a$ to be about 8.

The obtained estimate of the SFO is then applied to the substantially subsequent OFDM symbols.

The above described time-domain correction need not be performed if all of the estimation is done on pilot sub-carriers corrected with a last OFDM symbol's slope and mean estimates.

Although the method 100 includes steps 110-170 that are arranged serially in the exemplary embodiments, other embodiments of the present subject matter may execute two or more acts in parallel, using multiple processors or a single processor organized two or more virtual machines or subprocessors. Moreover, still other embodiments may implement the acts as two or more specific interconnected hardware modules with related control and data signals communicated between and through the modules, or as portions of an application-specific integrated circuit. Thus, the exemplary process flow diagrams are applicable to software, firmware, and/or hardware implementations.

Figure 2:
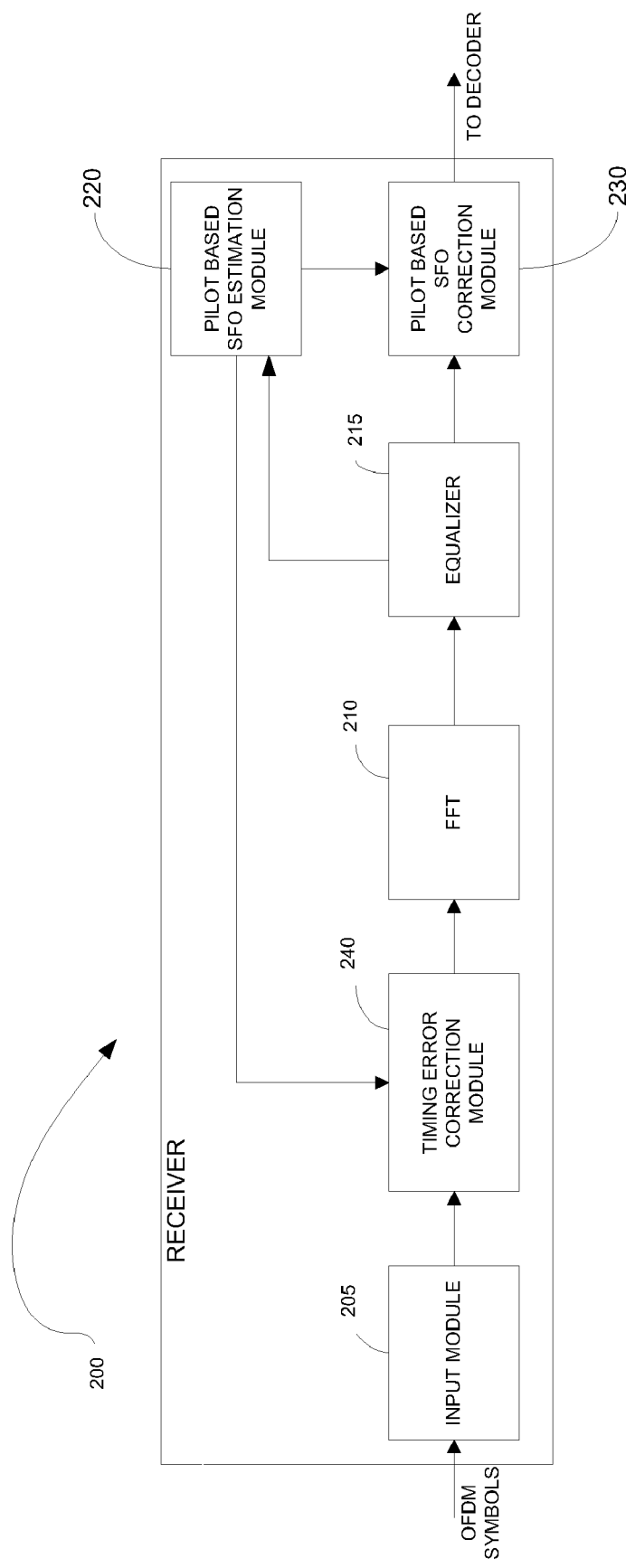
FIG. 2 is a block diagram illustrating an example receiver to implement the method for estimating the SFO estimation of FIG. 1.

Referring now to FIG. 2, there is illustrated an example receiver 200 implemented according to an embodiment of the invention. As shown in FIG. 2, the receiver 200 includes an input module 205, an FFT module 210, an equalizer 215, a pilot based SFO estimation module 220, a pilot based SFO correction module 230 and a timing error correction module 240.

In operation, the input module 205 receives a sequence of OFDM symbols. In these embodiments, each received OFDM symbol includes multiple pilot symbols. The FFT module 210 then performs an FFT operation on a current OFDM symbol received from the input module 205 and obtains data sub-carriers and associated multiple pilot sub-carriers. The pilot based SFO estimation module 220 then computes a slope of phase error associated with the multiple pilot sub-carriers. The pilot based SFO estimation module 220 then further computes a correction factor using the computed slope of phase error. The pilot based SFO correction module 230 then applies the correction factor to the data sub-carriers associated with one or more OFDM symbols starting with the current received OFDM symbol.

In these embodiments, the FFT module 210 performs an FFT operation on each of the substantially subsequent OFDM symbols to obtain associated data sub-carriers and multiple pilot sub-carriers. The pilot based SFO estimation module 220 computes slope of phase errors associated with the multiple pilot sub-carriers of each OFDM symbol. The pilot based SFO estimation module 220 further computes correction factors using the computed slopes of phase errors of subsequent OFDM symbols. The pilot based SFO correction module 230 then applies the correction factors to the associated data sub-carriers of one or more OFDM symbols received starting from each substantially subsequent OFDM symbol.

In some embodiments, the pilot based SFO estimation module 220 computes an average slope from the estimated slopes of phase errors associated with a predetermined number of OFDM symbols. The pilot based SFO estimation module 220 then computes the correction factor using the computed average slope.

In some embodiments, the pilot based SFO estimation module 220 estimates a rate of growth of computed slopes of phase errors associated with predetermined number of OFDM symbols. The pilot based SFO estimation module 220 then obtains an estimate of the SFO from the estimated rate of growth of the computed slopes of phase errors. The timing error correction module 240 then applies the obtained estimate of the SFO to substantially subsequent OFDM symbols before the FFT module 210.

In other embodiments, the pilot based SFO estimation module 220 computes an average slope using each one of multiple computed slopes of phase errors associated with each one of multiple predetermined number of OFDM symbols. The SFO estimation module 220 then estimates a rate of growth of the computed average slopes. The pilot based SFO estimation module 220 then obtains an estimate of the SFO from the estimated rate of growth of the computed average slopes. The Timing error correction module 240 then applies the estimated SFO to the substantially subsequent OFDM symbols before the FFT module 210.

The operation of the receiver 200 shown in FIG. 2 to estimate SFO is explained in more detail with reference to the FIG. 1.

Various embodiments of the present invention can be implemented in software, which may be run in the environment shown in FIG. 3 (to be described below) or in any other suitable computing environment. The embodiments of the present invention are operable in a number of general-purpose or special-purpose computing environments. Some computing environments include personal computers, general-purpose computers, server computers, hand-held devices (including, but not limited to, telephones and personal digital assistants (PDAs) of all types), laptop devices, multi-processors, microprocessors, set-top boxes, programmable consumer electronics, network computers, minicomputers, mainframe computers, distributed computing environments and the like to decode code stored on a computer-readable medium. The embodiments of the present invention may be implemented in part or in whole as machine-executable instructions, such as program modules that are decoded by a computer. Generally, program modules include routines, programs, objects, components, data structures, and the like to perform particular tasks or to implement particular abstract data types. In a distributed computing environment, program modules may be located in local or remote storage devices.

Figure 3:
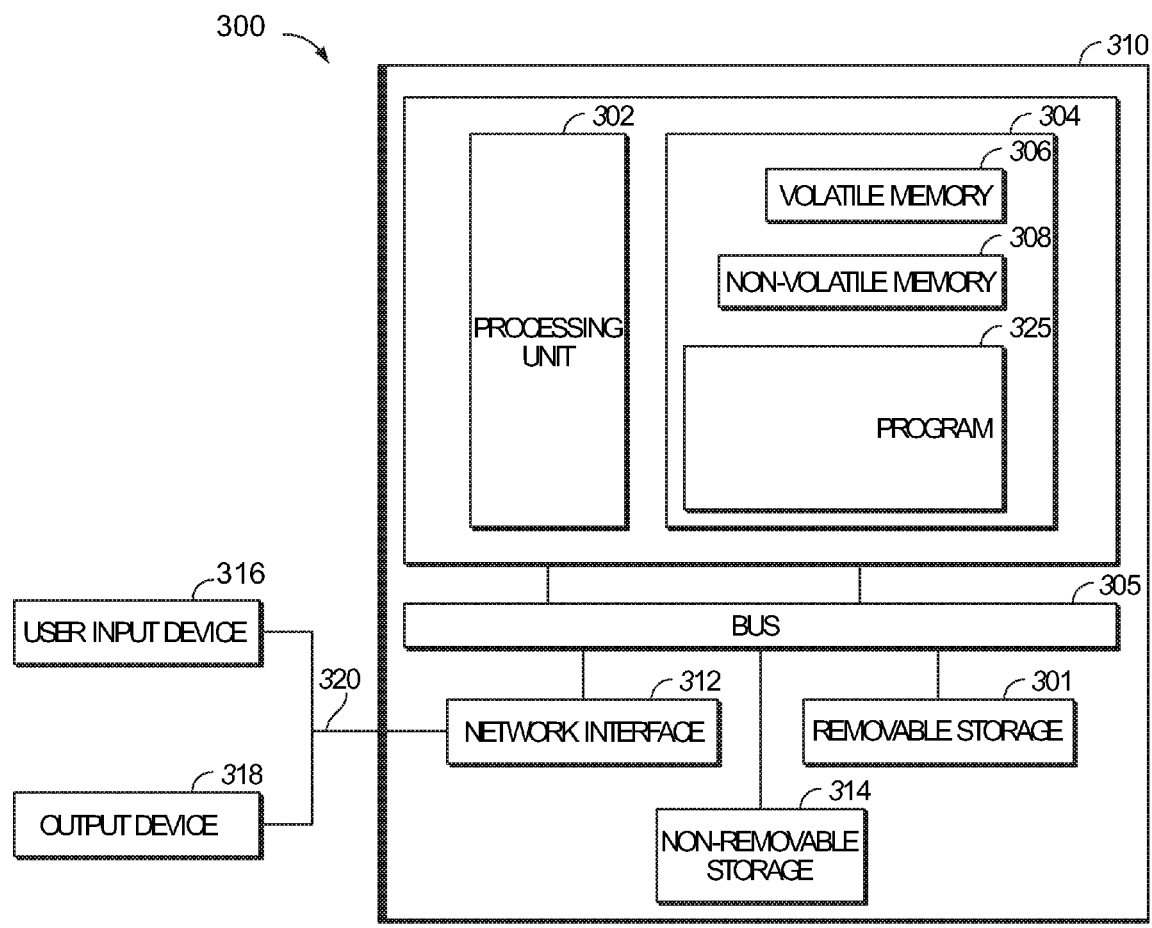
FIG. 3 is an example of a suitable computing environment for implementing the SFO estimation technique according to various embodiments of the present invention, such as those shown in FIGS. 1 and 2.

FIG. 3 shows an example of a suitable computing system environment for implementing embodiments of the present invention. FIG. 3 and the following discussion are intended to provide a brief, general description of a suitable computing environment in which certain embodiments of the inventive concepts contained herein may be implemented.

A general computing device, in the form of a computer 310, may include a processor 302, memory 304, removable storage 301, and non-removable storage 314. Computer 310 additionally includes a bus 305 and a storage area network interface (NI) 312.

Computer 310 may include or have access to a utility computing environment that includes one or more computing servers 340 and one or more disk arrays 360, a SAN 350 and one or more communication connections 320 such as a network interface card or a USB connection. The computer 310 may operate in a networked environment using the communication connection 320 to connect to the one or more computing servers 340. A remote server may include a personal computer, server, router, network PC, a peer device or other network node, and/or the like. The communication connection may include a Local Area Network (LAN), a Wide Area Network (WAN), and/or other networks.

The memory 304 may include volatile memory 306 and non-volatile memory 308. A variety of computer-readable media may be stored in and accessed from the memory elements of computer 310, such as volatile memory 306 and non-volatile memory 308, removable storage 301 and non-removable storage 314. Computer memory elements can include any suitable memory device(s) for storing data and machine-readable instructions, such as read only memory (ROM), random access memory (RAM), erasable programmable read only memory (EPROM), electrically erasable programmable read only memory (EEPROM), hard drive, removable media drive for handling compact disks (CDs), digital video disks (DVDs), diskettes, magnetic tape cartridges, memory cards, Memory Sticks™, and the like; chemical storage; biological storage; and other types of data storage.

"Processor" as used herein, means any type of computational circuit, such as, but not limited to, a microprocessor, a microcontroller, a complex instruction set computing (CISC) microprocessor, a reduced instruction set computing (RISC) microprocessor, a very long instruction word (VLIW) microprocessor, explicitly parallel instruction computing (EPIC) microprocessor, a graphics processor, a digital signal processor, or any other type of processor or processing circuit. The term also includes embedded controllers, such as generic or programmable logic devices or arrays, application specific integrated circuits, single-chip computers, smart cards, and the like.

Embodiments of the present invention may be implemented in conjunction with program modules, including functions, procedures, data structures, application programs, etc., for performing tasks, or defining abstract data types or low-level hardware contexts.

Machine-readable instructions stored on any of the above-mentioned storage media are executable by the processor 302 of the computer 310. For example, a computer program 325 may comprise machine-readable instructions capable of performing a correction scheme for the OFDM symbols received at a receiver by estimating SFO according to the teachings and herein described embodiments of the present invention. In one embodiment, the computer program 325 is included on a CD-ROM and loaded from the CD-ROM to a hard drive in non-volatile memory 308. The machine-readable instructions cause the computer 310 to estimate SFO according to the various embodiments of the present invention.

The SFO estimation technique of the present invention is modular and flexible in terms of usage in the form of a "Distributed Configurable Architecture". As a result, parts of the SFO estimation system may be placed at different points of a network, depending on the model chosen. For example, the technique can be deployed in a server and the input and output instructions streamed over from a client to the server and back, respectively. Such flexibility allows faster deployment to provide a cost effective solution to changing business needs.

The above description is intended to be illustrative, and not restrictive. Many other embodiments will be apparent to those skilled in the art. The scope of the invention should therefore be determined by the appended claims, along with the full scope of equivalents to which such claims are entitled.

The above-described methods and apparatus provide various embodiments for encoding characters. It is to be understood that the above-description is intended to be illustrative, and not restrictive. Many other embodiments will be apparent to those of skill in the art upon reviewing the above-description. The scope of the subject matter should, therefore, be determined with reference to the following claims, along with the full scope of equivalents to which such claims are entitled.

As shown herein, the present invention can be implemented in a number of different embodiments, including various methods, a circuit, an I/O device, a system, and an article comprising a machine-accessible medium having associated instructions.

Other embodiments will be readily apparent to those of ordinary skill in the art. The elements, algorithms, and sequence of operations can all be varied to suit particular requirements. The operations described-above with respect to the method 100 illustrated in FIG. 1 can be performed in a different order from those shown and described herein.

FIGS. 1, 2, and 3 are merely representational and are not drawn to scale. Certain proportions thereof may be exaggerated, while others may be minimized. FIGS. 1-3 illustrate various embodiments of the invention that can be understood and appropriately carried out by those of ordinary skill in the art.

It is emphasized that the Abstract is provided to comply with 37 C.F.R. §1.72(b) requiring an Abstract that will allow the reader to quickly ascertain the nature and gist of the technical disclosure. It is submitted with the understanding that it will not be used to interpret or limit the scope or meaning of the claims.

The above-described implementation is intended to be applicable, without limitation, to situations where improvement to an OFDM system is sought, considering the use of SFO estimation. The description hereinabove is intended to be illustrative, and not restrictive. The various embodiments of the method of improving the OFDM system described herein are applicable generally to any OFDM system, and the embodiments described herein are in no way intended to limit the applicability of the invention. Many other embodiments will be apparent to those skilled in the art. The scope of this invention should therefore be determined by the appended claims as supported by the text, along with the full scope of equivalents to which such claims are entitled.

The invention claimed is:

1. A method, comprising:
   receiving a sequence of OFDM symbols by a receiver, wherein each OFDM symbol includes multiple pilot symbols;
   performing an FFT on a current OFDM symbol to obtain data sub-carriers and associated multiple pilot sub-carriers;
   computing a slope of phase error associated with the multiple pilot sub-carriers;
   repeating the above steps of receiving, performing, computing the slope of phase error for each subsequent OFDM symbol;
   computing an average slope from computed slopes of phase errors associated with a predetermined number of OFDM symbols;
   computing a correction factor using the computed average slope;
   applying the correction factor to the data sub-carriers associated with one or more OFDM symbols starting from the current OFDM symbol and for each subsequent OFDM symbol;
   estimating a rate of growth of computed slopes of phase errors associated with the predetermined number of OFDM symbols;
   obtaining an estimate of the sampling frequency offset (SFO) from the estimated rate of growth of the computed slopes of phase errors; and
   applying a timing error correction before performing the FFT using the obtained estimate of the SFO to the subsequent OFDM symbols.

2. The method of claim 1, wherein obtaining the estimate of the SFO comprises:
   estimating a rate of growth of the computed average slopes;
   obtaining an estimate of the SFO from the estimated rate of growth of the computed average slopes; and
   applying a timing error correction before performing the FFT using the estimate of the SFO to the subsequent OFDM symbols.

3. An article of manufacture comprising:
   a non-transitory computer-readable storage medium having instructions that, when executed by a computer, causes the computer to perform a method, comprising:
   receiving a sequence of OFDM symbols by a receiver, wherein each OFDM symbol includes multiple pilot symbols;
   performing an FFT on a current OFDM symbol to obtain data sub-carriers and associated multiple pilot sub-carriers;
   computing a slope of phase error associated with the multiple pilot sub-carriers;
   repeating the above steps of receiving, performing, computing the slope of phase error for each subsequent OFDM symbol;
   computing an average slope from computed slopes of phase errors associated with a predetermined number of OFDM symbols;
   computing a correction factor using the computed average slope;
   applying the correction factor to the data sub-carriers associated with one or more OFDM symbols starting from the current OFDM symbol and for each subsequent OFDM symbol;
   estimating a rate of growth of computed slopes of phase errors associated with the predetermined number of OFDM symbols;
   obtaining an estimate of the SFO from the estimated rate of growth of the computed slopes of phase errors; and
   applying a timing error correction before performing the FFT using the obtained estimate of the SFO to the subsequent OFDM symbols.

4. The article of manufacture of claim 3, wherein obtaining the estimate of the SFO comprises:
   estimating a rate of growth of the computed average slopes;
   obtaining an estimate of the SFO from the estimated rate of growth of the computed average slopes; and
   applying a timing error correction before performing the FFT using the estimate of the SFO to the subsequent OFDM symbols.

5. A receiver of an OFDM system, comprising:
   an input module for receiving a sequence of OFDM symbols, wherein each OFDM symbol includes multiple pilot symbols;
   an FFT module for performing an FFT operation on a current OFDM symbol and on each of the subsequent OFDM symbols to obtain data sub-carriers and associated multiple pilot sub-carriers of each OFDM symbol;

a pilot based SFO estimation module for computing a slope of phase error associated with the multiple pilot sub-carriers of each OFDM symbol, wherein the pilot based SFO estimation module computes an average slope from the estimated slopes of phase errors associated with a predetermined number of OFDM symbols, wherein the pilot based SFO estimation module computes a correction factor using the computed average slope;

a pilot based SFO correction module for applying the correction factor to the data sub-carriers associated with one or more OFDM symbols starting from the current OFDM symbol and for each subsequent OFDM symbol; and a timing error correction module, wherein the pilot based SFO estimation module to estimate a rate of growth of computed slopes of phase errors associated with predetermined number of OFDM symbols, wherein the pilot based SFO estimation module to obtain an estimate of the SFO from the estimated rate of growth of the computed slopes of phase errors, and wherein the timing error correction module to apply the obtained estimate of the SFO to subsequent OFDM symbols before performing the FFT operation.

6. The receiver of claim 5, wherein the SFO estimation module estimates a rate of growth of the computed average slopes, wherein the pilot based SFO estimation module obtains an estimate of the SFO from the estimated rate of growth of the computed average slopes, and wherein the timing error correction module applies the estimated SFO to the subsequent OFDM symbols before performing the FFT operation.

* * * * *